United States Patent Office 3,397,462
Patented Aug. 20, 1968

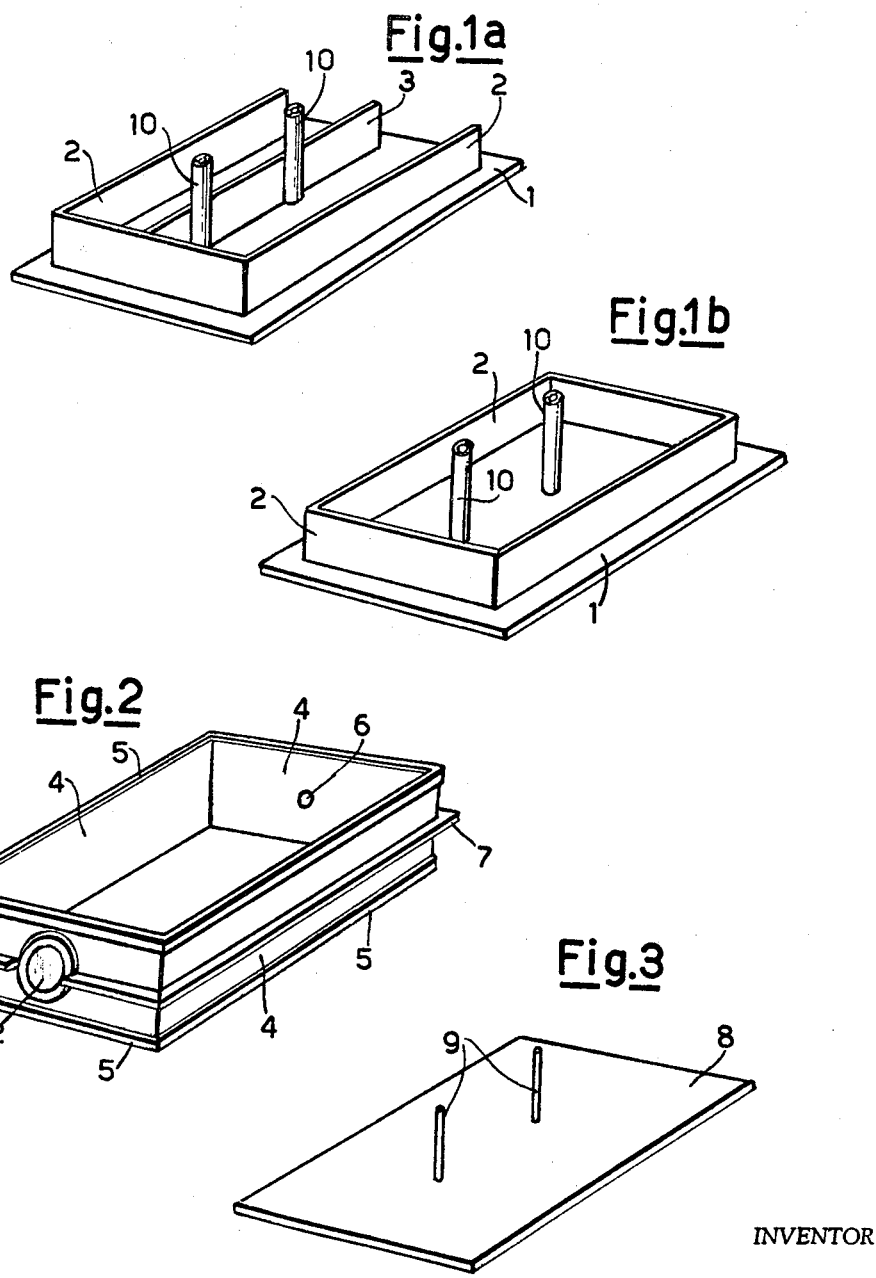

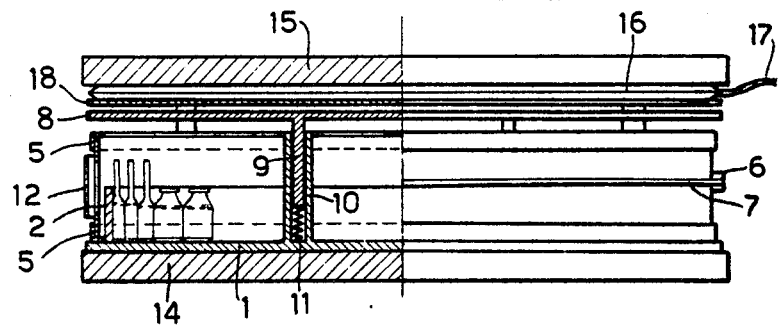
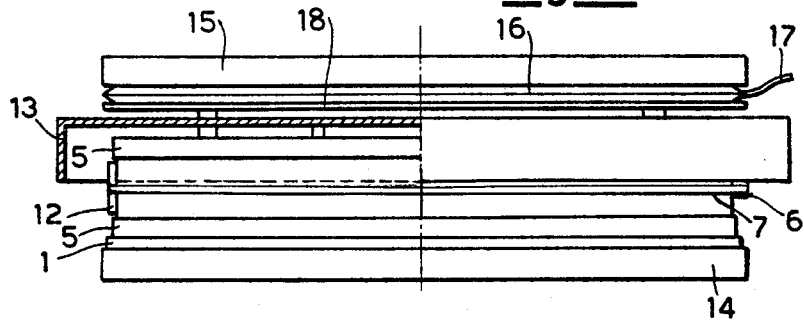
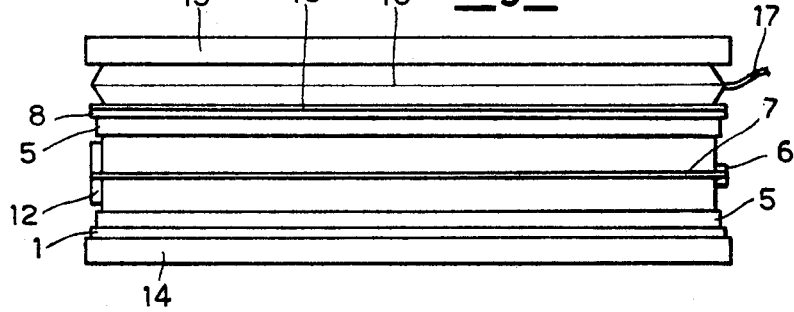

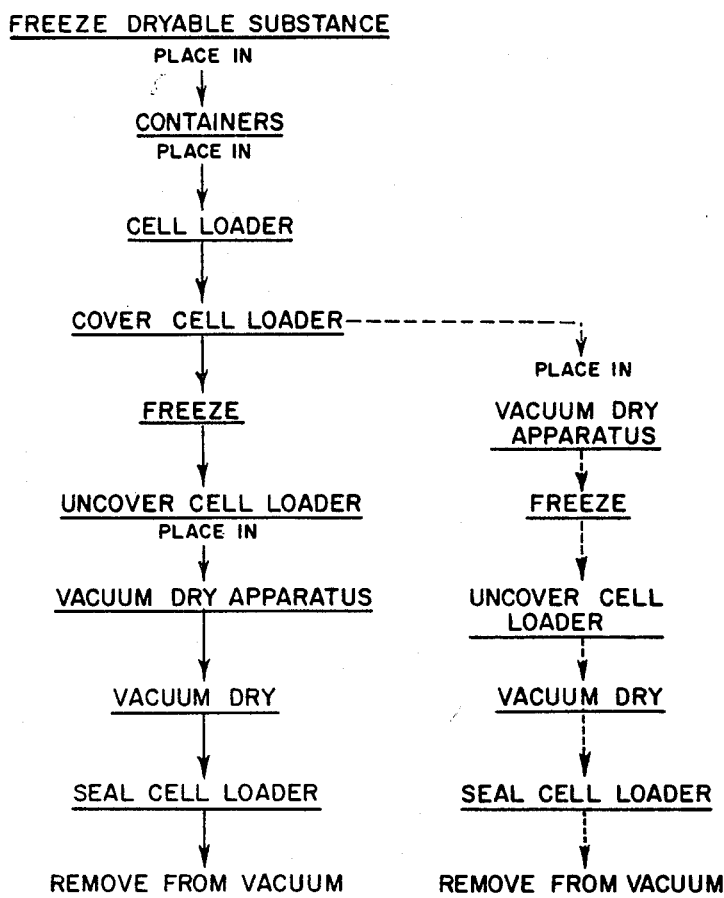

3,397,462
APPARATUS FOR LYOPHILIZATION OF SUBSTANCES CONTAINING AN AQUEOUS PHASE
Maria Sonia Martinis Marchi Jellicich, Milan, Italy, assignor to Edwards High Vacuum International Ltd., Crawley, Sussex, England, a company of the United Kingdom
Filed Feb. 16, 1966, Ser. No. 527,659
Claims priority, application Italy, Feb. 20, 1965, 746,655
8 Claims. (Cl. 34—92)

It is known that lyophilization, or freeze-drying, consists in drying in a vacuo pre-frozen substances, by causing the aqueous phase contained therein to be sublimated, said aqueous phase being in the solid form (ice).

The lyophilization process is applied, in addition to foodstuffs (such as fruit juices, milk, meat etc.) also to pharmaceutical products, polyvitamin solutions, vaccines, sera, antibiotics, blood plasma etc. These products are initially in the liquid or semi-liquid state and special precautions should be taken in order that they may be maintained in sterile conditions during the whole processing run, until they, upon complete drying, will be aseptically sealed in containers adapted to assure their preservation in time.

In the pharmaceutical freeze-drying, the substance to be frozen-dried, previously sterilized, is apportioned into individual containers, ampoules, or small bottles, which are loaded into the free-drying chambers by means of loaders to be frozen and then dried; the substance can also be placed, in bulk, on trays.

The freezing step, commonly called pre-freezing, can take place either directly in the drying chamber if the latter is equipped with freezing plates, or in separate predryers.

Upon completion of freeze-drying step it is essential, to ensure the keeping of the substance, that the ampoules be closed and the bottles be stoppered and sealed, or that the frozen-dried material contained in the trays be transferred into other sealtight containers.

Before that these preliminary packing operations, which normally last for several hours on account of the high amounts of material to be handled, the frozen-dried substance is transferred into another vacuum-chamber which is commonly called a "storage closet."

During the vacuum-breaking operations in the autoclave of the freeze-drier and the subsequent transfer operations, the dried substances, which are extremely hygroscopical, are exposed to the ambient air and thus they become liable to possible pollutions by micro-organisms, oxidizing and rehydration. All of these factors are such as to increase the possibility of pollution and degradation of the frozen-dried substances, even if these operations are carried out, of necessity, in a sterile environment whose relative humidity rating is kept under control.

Said sterile environments are very costly, more particularly as far as conditioning and the relatively low relative humidity rating requested are particularly concerned.

In practice, in order that risks of rehydration of the frozen-dried substances may be not gone into, the percentage of ambient humidity should be almost nil, a condition which is unpracticable for the requirements of human life: as a matter of fact the residual humidity rating which is necessary for keeping the frozen-dried substances unaltered with the lapse of time is of about 0.5%.

The present invention relates to a method for treating frozen-dryable substances before, during and after freeze-drying, characterized by comprising the sequential steps of loading the substance to be freeze-dried in a cell-loader which can be closed in a vacuum-tight manner, placing said loader in the chamber of a freeze-drying apparatus, carrying out the freeze-drying with the cell-loader in an open condition, closing then in a vacuum-tight manner said loader, carrying out the vacuum-breaking step in the freeze-drier chamber, removing the closed loader from said chamber, breaking the vacuum in the cell-loader immediately prior to the final handling operations of the substance and eventually carrying out the packaging operations of the frozen-dried substance removed from the loader.

The present invention also relates to a cell-loader which can be closed in a vacuum-tight manner, for ampoules, small bottles or trays containing a substance to be freeze-dried according to the inventive method, characterized in comprising a base plate, a frame and a lid, guiding means being provided for a correct mutual assemblage of said plate, frame and lid, sealing means between said plate, said frame and said lid, and means, operable from the outside of said cell-loader and capable of permitting gas intake therewithin.

By using the inventive method and by adopting the inventive cell-loader, the following outstanding advantages are obtained, inter alia, namely:

(a) Setting aside any danger of pollution and rehydration of the substance introduced into the ampoules, bottles or trays, which is exposed in the open condition during the transfer from a possible separate pre-freezer to the freeze-drier proper during the vacuum-breaking in the drying chamber of said freeze-drier and also during the transfer from the freeze-drier to the storage cabinet.

(b) Dispensing with humidity conditioning in the sterile environment.

(c) Dispensing with storage cabinets.

(d) Keeping the frozen-dried substance under conditions of absolute sterility and dryness.

The foregoing and other advantages will become apparent from the ensuing description, in which, by way of example only and without implying any limitation and having reference to accompanying drawings, an embodiment of the cell-loader and another alternative embodiment thereof are illustrated, while concurrently explaining the treatment method according to the invention.

In the drawings:

FIGURES 1a and 1b are illustrative, in a perspective showing from above, of two different embodiments of the base plate of the cell-loader.

FIGURE 2 is a perspective view of the frame which is an integral part of said loader.

FIGURE 3 shows the lid of the cell-loader, said lid being shown upside down.

FIGURES 4 and 4a show, part in cross-section, the base plate, the frame and two different kinds of lids assembled to form two cell-loaders which are inserted, not yet closed, in the freeze-drying chamber, and FIGURE 5 shows the loader of FIG. 4, closed in the freeze-drying chamber at the end of the freeze-drying cycle.

FIGURE 6 is a diagrammatic sketch illustrating the various process steps according to the treatment method of the invention.

FIGURES 1a to 3 inclusive show the component parts of a cell-loader. More particularly, the FIGURES 1a and 1b show two kinds of base plates, the first of which is adapted to carry ampoules and small bottles, while the second one is a liquid-tight tray. Each base plate is essentially formed by a plate 1 from the edges whereof vertical sidewalls 2 are extended. Said walls in the case of FIG. 1b, define with the plate 1, a liquid-tight tray. This is not so in the case of the baseplate of FIG. 1a, in which a sidewall is lacking but a longitudinal partition wall 3 is provided.

FIGURE 2 shows the frame formed by the four sidewalls 4 which, as it will become clear hereinafter, are intended for forming the vertically extending sidewalls of the cell-loader. Resilient seals 5, made of a molded elastomer, are mounted on the edges of each sidewall 4 of the frame, the cross-sectional of said seals being like an L. On a wall of the frame an air intake valve 6 is fitted and can be controlled from outside. Another sidewall mounts a transparent peep-hole 12 for checking the contents of the cell-loader when closed. The sidewalls 4, moreover, are reinforced by a rib 7 which is extended along the entire periphery thereof, and is intended for strengthening the frame against stresses induced by the atmospherical pressure when the cell is closed and there is vacuum therein, the cell being exposed to ambient pressure. FIGURE 3, eventually, illustrates, in an upside down posture, a lid of the loader, formed by a plate 8 from a face whereof two cylindrical dowels 9 are extended in a perpendicular direction: the size of the cylindrical dowels 9 is such as to match the bores formed through two hollow cylinders 10 mounted on the baseplate 1 of the loader (FIGURES 1a and 1b) and extending perpendicular thereto.

The positioning and the mutual distances of the cylinders 10 and the dowels 9, as well as the geometrical size and configuration of the walls 2 are such that it is possible to place the frame upon the baseplate with the sidewalls 4 arranged externally of the walls 2 and to mount thereafter the lid upon the same baseplate by slipping the dowels 9 into the bores of the vertical guiding cylinders 10. By so doing, a container proper is obtained, having a prismatic configuration and capable of withstanding, when it is closed in a vacuum-tight manner, the pressure of the outside atmosphere.

In FIGURE 4 the container is shown with its lid kept lifted above the upper edges of the frame by two springs 11 arranged, each, within each hollow cylinder and urging the free ends of the dowels 9.

FIGURES 4 and 4a show, partly in cross-section, two cell-loaders, the loader of FIG. 4a having a hood-like lid different from the lid shown in FIG. 4 in which the lids are kept lifted by the springs 11 aforementioned. Said cell-loaders are shown introduced within the freeze-drying chamber comprising a lower supporting plate 14 on which the baseplate of the loader rests, and a front support plate 15 which bears, above the loader's lid, a bag 16 made of a resilient material such as rubber, with a tube 17 for blowing air inside, the bag being shown deflated in FIGS. 4 and 4a.

The bag 16 carries, in turn, a pressure plate 18 in its lower part, said plate pressing, when the bag is inflated through the tube 17, against the cell-loader thus inducing the closure thereof as shown in FIGURE 5.

If the cell container is loaded in a sterile environment or under a sterile hood to which access is gained only by means of a glove box or other implement adapted to the purpose, the individual container for the substance to be freeze-dried are manipulated under sterile conditions. Once the loading step is completed, the cell lid is positioned and supported by the springs 11 and the whole cell can be placed into a chamber for pre-freezing the liquid products. At this stage the air-intake valve 6 is closed.

The majority of the pollution cases take place due to falling of contaminants, contained in the ambient air, into the containers, but the presence of the lid placed above the baseplate and the frame renders the risk of pollution of the product negligible during transfer from the loading chamber to the pre-freezing step and also during said pre-freezing step.

Said risk can be further reduced by employing a hood-like lid such as the one shown under the numeral 13 in FIG. 4a. As an alternative, the lid can be closed by placing proper loads thereon or by using external clamps or also by a locking system (not shown for simplifying the drawings) of the lever-controlled type, which can be controlled either mechanically or electromagnetically and directly in the inside of the freeze-drying chamber.

As a further alternative, the cell, with its own lid on and loaded, can be directly placed in the freeze-drier's chamber, if equipped with freezing plates, for pre-freezing the product: the latter will then be subsequently dried.

In such a case, the lid can be lifted after the pre-freezing stage by a lifting device, either mechanical or electromagnetic, controlled from the outside and not shown for the sake of simplicity. In a still simpler way, the lid can be lifted by removing the weights placed thereon or releasing the clamps which kept the lid closed.

A further possibility is afforded by allowing the lifting of the lid to take place exploiting the pressure differential between the inside and the outside of the cell: the lid will be lifted as the freeze-drier's chamber is being evacuated.

The purpose of lid lifting is that of permitting that the water vapor evolved from the product freeze-drying may be vented off.

During freeze-drying, the latent heat of sublimation is normally supplied by providing to heating the freeze-drier's walls, or, more often, by heating the plates on which the product containers are directly resting, or the trays carrying said containers.

As illustrated in FIG. 6, the method of the present invention for treating freeze dryable substances, comprises the sequential steps of filling containers with the substance to be freeze dried, placing such containers into a cell-loader which can be sealed, freezing the substances while in the sealed cell-loader followed by subjecting the frozen substances to a vacuum drying step during which the sealed cell-loader is opened and then resealing the cell-loader after the drying has been completed and prior to removing the substances from the vacuum. It further illustrates an alternative method in dotted line wherein the freezing may be accomplished while in the vacuum drying apparatus.

In the preferred embodiments of the instant invention, the cell-loader(s) as described are placed in the freeze-drying chamber by causing them directly to rest on the baseplates (FIGS. 4, 4a and 5) which can either be freezing or heating plates.

The freezing of the baseplates of the freeze-drying chamber permits to pre-freeze the substance to be freeze-dried if the latter has been loaded in the liquid state and, at any rate, it allows to prevent melting of the substance, if separately pre-freezed, during the chamber evacuation period.

Heating supplies the energy which is necessary for sublimation.

During freeze-drying of pre-frozen liquids in containers, a noticeable fraction of the total sublimation heat is supplied to the interface of the ice which is sublimating, by conduction through the layer of substance which has not yet been frozen.

An insignificant fraction of the sublimation heat is, conversely, led through the layer of the already dried up substance whose thickness is being gradually increased as sublimation goes on.

Thus, the possibility that the lid of the cell-container may act as a shield for the heat which is irradiated or transferred downwardly by the plate 15 over said lid can be prevented by blackening the faces of the lid and obtaining in this manner a "black chamber" in a thermodynamical sense, or also by suitably heating the lid with electrical resistors or by putting it into direct contact with the upper plate which has been, in turn, suitably heated.

Upon completion of drying and of any necessary desorption with the cell-loader in the conditions shown FIG. 4 or 4a, the lid of the loader is closed by a mechanical lever system or with an electromagnetic device (not shown in the drawings) or also by inflating the rubber bag 16 through the tube 17, the bag being formed also by any resilient material, as shown FIGURE 5.

Once the drying chamber has been restored to atmospherical pressures, the bag 16 is deflated and the cell-loader(s) which have remained closed and under a vacuum, can be removed.

In the cell-loaders, the vacuum can be broken by feeding in atmospherical air or an inert gas, previously dehydrated and suitably sterilized, through the intake valve 6 which can be controlled from outside the loader. Said vacuum breaking can take place before closing the ampoules or the bottles which contain the as treated substance or immediately prior to the operations for transferring the freeze-dried substance, which is in the bulk state in the trays, into sealtight containers.

The peep-hole, or transparent window 12, with which the cell-loader is equipped, allows for the inspection of a part of the substance during the several stages of the process, including the drying up stage, provided that the chamber in which drying up is performed, is equipped, in turn, with a peep-hole arranged in a suitable position.

Visibility within the cell can be greatly improved by forming the baseplate of the cell with vertical walls which are made, wholly or partially, of a transparent material.

The cell may be made of several materials, among which stainless steel is preferred, but aluminum, copper, brass, alloys and plastic materials can be used, both alone and in combination with stainless steel.

Suitable devices for measuring the temperatures of the products, for example thermocouples, resistance thermometers and the like can be used, provided that the walls and/or the lid of the cell are fitted with suitable connection electrodes.

What is claimed is:

1. An apparatus for use in lyophilization of a substance containing an aqueous phase comprising in combination a baseplate, a frame and a lid, guide means for assembling said frame on said plate and said lid on said frame, means for insuring a tight seal in said assemblage, and means for permitting entry of gas into said sealed assemblage, said gas entry means being controlled from outside of said assemblage.

2. An apparatus according to claim 1, wherein said baseplate, frame and lid are initially separate members.

3. An apparatus according to claim 2, wherein sealing means is an elastomeric substance mounted on the edges of said frame member.

4. An apparatus according to claim 1, wherein said guide means comprises mating hollow cylinders and dowels mounted respectively on said baseplate and said lid and positioned to prevent transversal displacement of said baseplate to said lid.

5. An apparatus according to claim 4, wherein said hollow cylinders contain a spring, said spring partially filling said cylinder and adapted to exert pressure against said dowels.

6. An apparatus according to claim 3, wherein said guide means further includes sidewalls mounted on said baseplate and positioned to contact said frame to prevent transversal displacement of said frame and said baseplate.

7. An apparatus according to claim 2, wherein said frame member includes a reinforcing rib extending along the walls of said frame.

8. An apparatus according to claim 6, wherein said sidewalls are transparent.

References Cited
UNITED STATES PATENTS

| | | | |
|---|---|---|---|
| 2,353,986 | 7/1944 | Barr | 34—5 |
| 2,494,541 | 1/1950 | Burr | 34—5 |
| 3,245,152 | 4/1956 | Natelson | 34—5 |

WILLIAM J. WYE, *Primary Examiner.*